Figure 2:
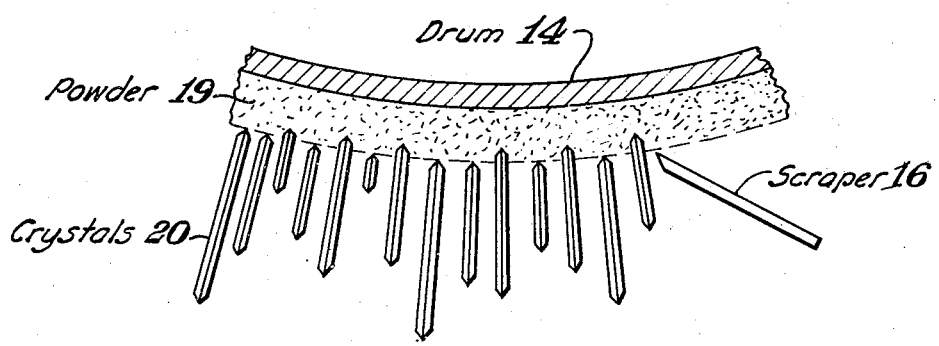

Oct. 7, 1941.  R. C. KIRK  2,257,910

PROCESS OF CONDENSING MAGNESIUM VAPORS

Filed Feb. 3, 1940

INVENTOR
Roy C. Kirk
BY Griswold & Burdick
ATTORNEYS

Patented Oct. 7, 1941

2,257,910

UNITED STATES PATENT OFFICE 2,257,910

PROCESS OF CONDENSING MAGNESIUM VAPORS

Roy C. Kirk, Midland, Mich., assignor to The Dow Chemical Company, Midland, Mich., a corporation of Michigan Application February 3, 1940, Serial No. 317,076

10 Claims. (Cl. 75—67)

This invention relates to a method of condensing magnesium vapors. More particularly it concerns a process for condensing magnesium from vapor phase admixture with carbon monoxide and recovering it in solid crystalline form.

In the preparation of metallic magnesium by the thermal reduction of magnesia-containing materials with carbon, the magnesium is liberated at a very high temperature, usually well above 1000° C. in vapor admixture with carbon monoxide, and must be recovered by condensation. As is known, the magnesium vapors should be cooled and condensed in such manner as to minimize the chemical interaction between the magnesium and the carbon monoxide which inevitably occurs during the condensation. For this reason, the condensation is usually carried out with extreme rapidity, either by causing the vapor mixture to impinge upon an extensive cold clean surface, or by injecting large volumes of cold fluids, such as hydrogen or kerosene, into the vapor mixture. Unfortunately, the magnesium, when subjected to shock-condensation in this manner, is recovered as an extremely fine pyrophoric powder which is dangerous to handle and does not coalesce to a liquid on melting but must be converted to massive magnesium by re-distillation or other expensive procedure.

With these disadvantages in mind, it is an object of the present invention to provide a process whereby magnesium can be recovered directly from vapor-phase admixture with carbon monoxide in the form of relatively coarse crystals of comparatively high purity which can easily be melted down to reguline magnesium.

In the process of the invention, magnesium vapor is condensed to solid metal by passing the magnesium-carbon monoxide vapor mixture, in the substantial absence of other oxidizing gases, usually at a temperature well above 1000° C. and at sub-atmospheric pressure, directly into contact with a cooled surface maintained at a temperature below the freezing temperature of magnesium (650° C.). The invention resides primarily in the discovery that by carefully controlling the temperature or pressure at which condensation takes place, or by employing condensing surfaces of crystalline magnesium, it is possible to recover the magnesium largely in the form of relatively coarse non-pyrophoric crystals of comparatively high purity.

Thus, with regard to temperature, it has been found that when the condensation is carried out under sub-atmospheric pressure at temperatures sufficiently elevated, the magnesium condenses principally as a solid mass of relatively coarse compact crystals which are not substantially oxidized by the carbon monoxide present, and can be coalesced easily on melting. The lowest permissible operating temperature below which magnesium does not deposit in crystalline form cannot be stated exactly, since it depends somewhat upon other conditions, but for most condensing surfaces it is about 300° C. Optimum results are ordinarily obtained in the range 400°–550° C. These temperature effects appear to be largely independent of the nature of the condensing surface, which may be carbon or graphite, iron, steel or other metals, or even oxidic materials such as magnesia or silicate refractories.

It is to be understood that the temperatures just referred to are those of the surface on which condensation is occurring and are not necessarily those of the original condenser surface. For instance, at rapid condensation rates, when a thick layer of crystalline metal has already been deposited, the condenser itself may be considerably below 300° C., even though the surface of previously deposited metal on which the vapors are condensing is above this temperature. It will further be appreciated that the accurate measurement of such condensing surface temperatures is itself a difficult problem, and that the numerical temperatures mentioned above are therefore only the best approximations possible with available methods. In commercial operation, the temperature is usually judged by indirect observation. That is, the temperature controls of the condenser are adjusted so that the magnesium condenses largely as a solid crystalline mass. The surface is then of necessity at the desired temperature.

In addition to taking cognizance of the temperature effects just described, the present invention also includes the discovery that in the condensation of magnesium on cooled surfaces, the absolute pressure of the vapor mixture being condensed is of major significance. Thus, although operation at atmospheric pressure is recommended in the prior art, it does not appear to be commercially practicable, since there is serious attack of the condensed magnesium by the carbon monoxide present; it is rarely possible to obtain a condensate containing less than about 50 per cent of magnesia, even under the most favorable conditions. In contrast, it has now been found that by operation at sub-atmospheric pressure, preferably at pressures below about 100 millimeters of mercury, there is easily obtained a metal condensate satisfactory for most purposes, i. e. one which usually contains at least 65–75 percent of magnesium, and can be coalesced on heating.

A further marked advantage is obtained by controlling the pressure of the vapor to be condensed below about 25 millimeters of mercury, since in this case reversion is avoided for all practical purposes, and the condensate contains at least about 80 per cent of magnesium. Moreover, it is also observed that the condensate formed at these lowest pressures, when melted, coalesces to reguline magnesium much more readily than condensate formed at the higher pressures. This improved coalescence is noted in the process of the invention even when the condensation is carried out at room temperature, and the condensed magnesium is in powder form.

Although condensation at sub-atmospheric pressures, especially at pressures below 25 millimeters, is highly advantageous for the reasons explained, it has been found impractical to operate at absolute pressures much below 5 millimeters of mercury, 3 millimeters being an approximate minimum value. Under these latter conditions, the volume of carbon monoxide to be exhausted from the condenser is so enormous as to render commercial operation virtually out of the question with present-day equipment.

By utilizing simultaneously the preferred ranges of temperature and pressure already disclosed, it is possible to effect further improvements in the condensation of magnesium according to the invention. Thus, by operating both at absolute pressures below 100 millimeters of mercury, (especially below 25 millimeters), and at surface temperatures above about 300° C., the magnesium condensate is obtained in exceptional purity and almost entirely in the form of relatively coarse crystals which can be coalesced easily on melting.

As already noted, condensation of magnesium according to the invention may be carried out on cooled surfaces formed of a variety of materials. However, it has been found especially advantageous to effect condensation on surfaces having crystalline metallic magnesium adhering thereto. By operating in this manner, even when employing temperatures and pressures somewhat outside the preferred ranges already explained, the condensed magnesium is obtained in the form of relatively coarse crystals, say 0.02 inch to 2 inches in length, instead of the extremely fine powder (300 mesh or finer) ordinarily formed by shock-condensation in the presence of carbon monoxide. This fact is explained by the hypothesis that the magnesium particles present on the initial condensing surface act as nuclei for the deposition of magnesium vapor, so that crystal growth is favored at the expense of powder formation. In addition, because of the presence of the particles or nuclei there is less tendency for the magnesium vapor to supercool before condensing, and as a result the magnesium remains in the vapor state for a shorter period of time and thus has less opportunity for vapor phase reaction with the carbon monoxide present.

In the actual practice of the invention, condensation of magnesium from vapor admixture with carbon monoxide at sub-atmospheric pressure is usually carried out in a chamber which can be evacuated and which contains one or more condenser surfaces provided with cooling means for withdrawing the heat of condensation at any desired temperature level. These surfaces, which are usually plates, tubes, drums, or the like, are preferably positioned so that the vapor mixture of magnesium and carbon monoxide entering the condenser impinges directly thereon. In this way the vapor mixture can be cooled almost instantly from a temperature above 1000° C. to below the freezing temperature of magnesium, and interaction of the magnesium and carbon monoxide in the vapor state is substantially avoided.

Figure 1:
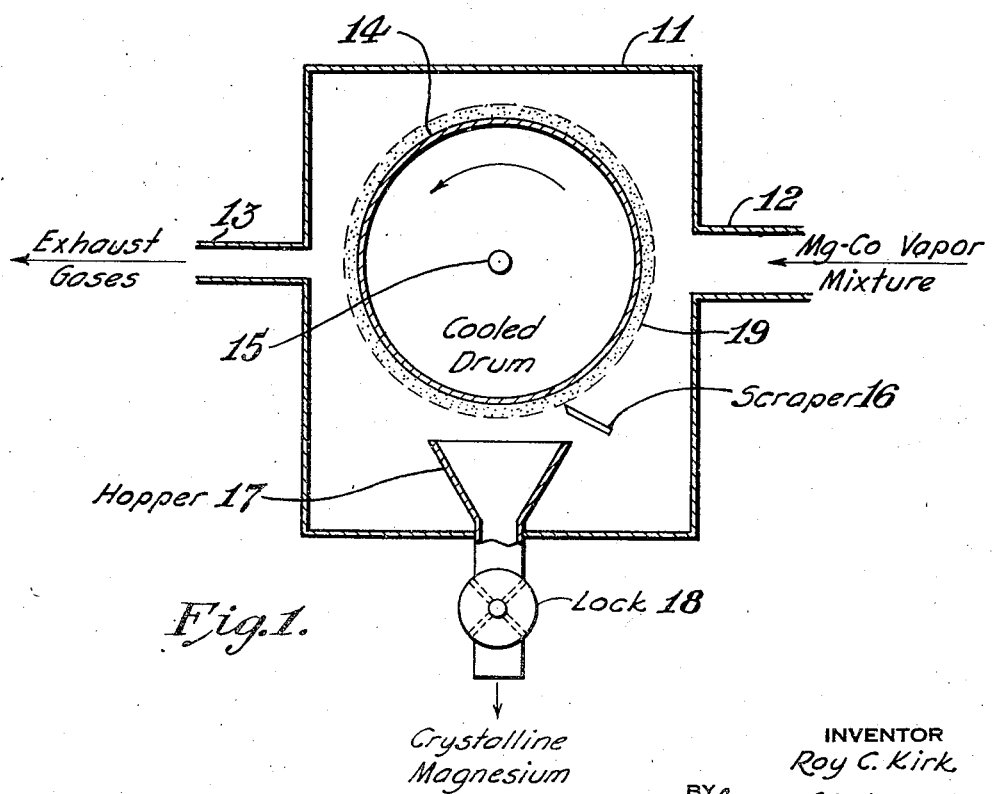

The detailed operation of one form of the process of the invention may be explained with reference to the accompanying drawing in which Figure 1 is a diagrammatic sectional elevation showing one form of apparatus adapted to carry out the process; and Figure 2 is a detailed view of the drum and scraper of the apparatus of Figure 1, at one instant during operation.

The condenser shown in Figure 1 consists of a closed chamber 11 provided with a vapor inlet 12 and an opposite gas outlet 13. Mounted within the chamber near the vapor inlet 12 is a drum 14 which may be rotated about its axis 15 and may be held at any desired temperature by adjustable internal cooling means not shown. Metal condensate formed on the drum is removed by an adjustable scraper 16 mounted so as to cause the scrapings to fall into a hopper 17 from which they can be withdrawn through a discharge lock 18.

In starting operation, the drum 14 is set in rotation at a relatively rapid rate, usually one or more revolutions per minute; the cooling means are adjusted to maintain the desired condensing temperature, preferably above 300° C., and the scraper blade 16 is moved away from the surface of the drum. Suction is applied to the gas outlet 13 to maintain a sub-atmospheric pressure, say, below 25 millimeters of mercury. The vapor mixture of magnesium and carbon monoxide is then introduced through the inlet 12 so that it impinges directly on the cooled rotating drum. The magnesium is immediately condensed, and the carbon monoxide escapes through the outlet 13.

If the drum 14 is initially at an elevated temperature above 300° C., the magnesium condensate, even when operation has just begun, is obtained largely as relatively coarse crystals, which may be scraped off at once. However, if the drum is initially cold, as is usually the case, the magnesium is at first condensed in the form of finely divided crystalline particles which cling to the drum and cover it with a powder layer 19 (Figure 2) which gradually becomes thicker. Even this fine powder contains a high percentage of crystalline magnesium metal, and can be coalesced, in contrast to the pyrophoric powder of the prior art; it may be recovered, if desired. However, in ordinary operation, the powder layer is usually allowed to build up to a certain thickness, usually 0.05 inch or more depending on the size of the condensing drum; it can then serve as a base of crystalline magnesium on which further condensation may take place. In addition, the condensing surface is allowed to attain a temperature of nearly 300° C. When this state is reached, the magnesium begins to condense in the form of needle-like crystals 20 (Figure 2) which grow from points in the powder layer in a direction nearly perpendicular to the drum, often to the height of 1.0 inch or more: the operator then slows down the rate of rotation of the drum 14 and adjusts the scraper 16 to a position such that it skims off the condensed crystal layer. The scraper may be so placed as to remove both the powder and the crystal layers or to remove the crystals alone without materially disturbing the powder layer (Figure 2). Operation is then continued as long as the vapor mixture of magnesium and carbon monoxide is supplied, the magnesium being condensed almost wholly in the form of relatively coarse crystals.

It is not essential that the magnesium crystals be removed at every rotation of the drum, since the crystals, once formed, continue to grow as long as magnesium vapor is supplied. Accordingly, in an alternative form of operation of the condenser, the drum 14 is rotated at a relatively rapid rate. The scraper 16 is ordinarily removed from the proximity of the drum surface, and is run in only periodically to skim off the crystal layer each time the crystals grow to a desired size.

It will be appreciated that the foregoing description is illustrative rather than strictly limitative and that the invention is co-extensive in scope with the following claims.

This application is a substitute for, and continuation-in-part of, my prior application Ser. No. 281,827, filed June 29, 1939.

I claim:

1. The method of condensing magnesium from vapor phase admixture with carbon monoxide, which comprises passing the vapor mixture at an absolute pressure between about 5 and about 100 millimeters of mercury into contact with a surface maintained at such an elevated temperature below the freezing temperature of magnesium that the magnesium vapor condenses thereon largely in the form of relatively coarse crystals, the said temperature being within the range between about 300° C. and about 650° C.

2. The method of condensing magnesium from vapor phase admixture with carbon monoxide which comprises passing the vapor mixture at an absolute pressure between about 5 and about 25 millimeters of mercury into contact with a surface maintained at such an elevated temperature below the freezing temperature of magnesium that the magnesium vapor condenses thereon largely in the form of relatively coarse crystals, the said temperature being within the range between about 300° C. and about 650° C.

3. In a method of recovering magnesium from vapor phase admixture with carbon monoxide at a temperature above 1000° C., the steps which comprise passing the vapor mixture under sub-atmospheric pressure directly into contact with a surface maintained at such an elevated temperature below the freezing temperature of magnesium that the magnesium vapor condenses thereon largely in the form of relatively coarse crystals, the said temperature being in the range between about 300° C. and about 650° C.

4. In a method of recovering magnesium from vapor phase admixture with carbon monoxide at a temperature above 1000° C., the steps which comprise passing the vapor mixture under an absolute pressure below about 25 millimeters of mercury, directly into contact with a surface maintained at such an elevated temperature below the freezing temperature of magnesium that the magnesium vapor condenses thereon largely in the form of relatively coarse crystals, the said temperature being in the range between about 300° C. and about 650° C.

5. In a method of recovering magnesium from vapor phase admixture with carbon monoxide at a temperature above 1000° C., the steps which comprise passing the vapor mixture under an absolute pressure below about 25 millimeters of mercury, directly into contact with a surface maintained at a temperature between about 400° C. and about 550° C.

6. The method of condensing magnesium from vapor phase admixture with carbon monoxide, which comprises passing the vapor mixture at an absolute pressure between about 5 and about 100 millimeters of mercury into contact with crystalline metallic magnesium maintained at such an elevated temperature below the freezing temperature of magnesium that the magnesium vapor condenses thereon in the form of relatively coarse crystals, the said temperature being within the range between about 300° C. and about 650° C.

7. In a method of condensing magnesium from vapor phase admixture with carbon monoxide, the steps which comprise providing a condenser surface having crystalline metallic magnesium adhering thereto, cooling the said surface so as to maintain the crystalline magnesium at a condensing temperature between about 300° C. and about 650° C., passing the vapor mixture of magnesium and carbon monoxide at sub-atmospheric pressure into contact with the crystalline magnesium until a deposit of relatively coarse magnesium crystals condenses thereon, and removing the crystals.

8. In a method of recovering magnesium from vapor admixture with carbon monoxide, the steps which comprise providing a surface coated with a layer of powder consisting essentially of finely divided crystalline metallic magnesium, cooling the said surface so as to maintain the powder layer at a condensing temperature below the freezing temperature of magnesium, passing the vapor mixture of magnesium and carbon monoxide at sub-atmospheric pressure into contact with the cooled finely divided magnesium powder until a deposit of relatively coarse magnesium crystals condenses thereon, removing the crystals without materially disturbing the layer of finely divided powder, and recovering the crystals.

9. In a continuous method of recovering magnesium from vapor phase admixture with carbon monoxide, the steps which comprise providing a surface coated with a layer of powder consisting essentially of finely divided crystalline metallic magnesium, cooling the said surface so as to maintain the powder layer at a condensing temperature below the freezing temperature of magnesium, passing a stream of the vapor mixture of magnesium and carbon monoxide at sub-atmospheric pressure into contact with the powder-coated surface until a deposit of relatively coarse magnesium crystals condenses thereon, withdrawing the powder-coated surface and adhering coarse crystalline condensate from the vapor stream, stripping off the coarse crystalline deposit without materially disturbing the underlying layer of finely divided magnesium powder, and thereafter returning the stripped powder-coated surface to the condensation step.

10. In a method of condensing magnesium from vapor phase admixture with carbon monoxide at a temperature above 1000° C., the steps which comprise providing a condenser surface having crystalline metallic magnesium adhering thereto, cooling the said surface so as to maintain the crystalline magnesium at a condensing temperature below the freezing temperature of magnesium, passing a stream of the hot vapor mixture while at an absolute pressure below 100 millimeters of mercury into direct and immediate contact with the said crystalline magnesium surface until a deposit of relatively coarse magnesium crystals condenses thereon, and moving the said condenser surface relative to the vapor stream continually to present fresh magnesium condensing surfaces to the stream.

ROY C. KIRK.